United States Patent [19]

Howard

[11] Patent Number: 4,900,566
[45] Date of Patent: Feb. 13, 1990

[54] CONFECTIONARY PRODUCT AND A PROCESS FOR PRODUCING THE SAME

[75] Inventor: Alan N. Howard, Cambridge, England

[73] Assignee: The Howard Foundation, Leeds, England

[21] Appl. No.: 277,438

[22] Filed: Nov. 28, 1988

Related U.S. Application Data

[63] Continuation of Ser. No. 12,511, Feb. 9, 1987, abandoned.

[30] Foreign Application Priority Data

Feb. 8, 1986 [GB] United Kingdom ............... 8603171

[51] Int. Cl.$^4$ ................................................ A23L 3/08
[52] U.S. Cl. ........................................ 426/72; 426/74; 426/103; 426/660; 426/804; 426/810
[58] Field of Search ................. 426/660, 810, 804, 72, 426/103, 74

[56] References Cited

U.S. PATENT DOCUMENTS

| | | | |
|---|---|---|---|
| 3,097,946 | 7/1963 | Menzi et al. | 426/804 |
| 3,741,776 | 6/1973 | Mitsuhashi et al. | 426/804 |
| 3,814,819 | 6/1974 | Morgan | 426/103 |
| 3,867,560 | 2/1975 | Menzi et al. | 426/804 |
| 4,018,901 | 4/1977 | Hayward | 426/72 |
| 4,154,867 | 5/1979 | Aldrich | 426/804 |
| 4,298,601 | 11/1981 | Howard | 426/804 |
| 4,408,041 | 10/1983 | Hirao | 426/804 |
| 4,415,596 | 11/1983 | Anderson | 426/103 |
| 4,442,132 | 4/1984 | Kim | 426/804 |
| 4,451,488 | 5/1984 | Cook et al. | 426/89 |
| 4,497,800 | 2/1985 | Larson et al. | 426/804 |
| 4,543,262 | 9/1985 | Michanowski | 426/660 |
| 4,714,620 | 12/1987 | Bunich et al. | 426/804 |

FOREIGN PATENT DOCUMENTS

| | | |
|---|---|---|
| 0127287 | 12/1984 | European Pat. Off. . |
| 2246276 | 5/1975 | France . |
| 1356370 | 6/1974 | United Kingdom . |
| 1508940 | 4/1978 | United Kingdom . |
| WO8603380 | 6/1986 | World Int. Prop. O. . |

OTHER PUBLICATIONS

EPO Search Report dated Jul. 8, 1987.

*Primary Examiner*—Jeanette Hunter
*Attorney, Agent, or Firm*—Cushman, Darby & Cushman

[57] ABSTRACT

The invention provides a process and confectionery product in the form of at least one bar. The product of the invention provides in said form a meal replacement or diet supplement and comprises a proteinaceous material and a carbohydrate material comprising indigestible carbohydrate. The proteinaceous material and the carbohydrate material are present in a relative weight ratio of from about 1:1 to about 1:10, and the indigestible carbohydrate is a carbohydrate having a molecular weight no higher than about 5,000.

13 Claims, No Drawings

CONFECTIONARY PRODUCT AND A PROCESS FOR PRODUCING THE SAME

This is a continuation of application Ser. No. 012,511, filed Feb. 9, 1987, which was abandoned upon the filing hereof.

BACKGROUND OF THE INVENTION (a) Field of the Invention

The present invention relates to a confectionery product and to a process for producing the same. In particular, the invention relates to a diet bar for use as part of a low calorie diet, especially a very low calorie diet.

(b) Description of the Prior Art

In British Specification No. 1,253,300 there is disclosed a method for sweetening foodstuffs. The disclosed method comprises incorporating lactitol into the foodstuffs so that they have an increased sweetness without a consequent increase in calorific value. Lactitol as used in the earlier invention is a reduction product of lactose having no energy value as food but which can afford sweetness and body to a food product. In the earlier specification the specific Examples show various food recipes incorporating lactitol and various foodstuffs, including those comprising protein. Thus, there are specific Examples of a carbonated drink, ice candy, sponge cake and condensed milk.

Furthermore, in British Specification No. 1,262,842 there is disclosed an ingredient for use in dietetic food compositions which will impart physical properties to the food compositions similar to the properties of natural foods which normally contain sugars, without adding substantial nutritive value to the food. The additive is defined as a mixture of polyglucoses in which each molecule has a structure wherein the 1,6-linkage predominates, and containing from 5 to 20% by weight of food-acceptable polyol chemically bonded thereto, said polyglucoses being soluble in water with substantial completeness and having a number average molecular weight between 1,500 and 18,000 and containing from 0.5 to 5 mole percent of polycarboxylic acid ester groupings with polycarboxylic acids as defined and used as a polymerization activator. Again, the specific Examples give various recipes for foodstuffs containing said mixture including cake, candy, ice cream etc. Similar non-nutritive carbohydrate substitutes are disclosed in related U.S. Specification Nos. 3,766,165 and 3,876,794.

Additionally, in British Specification No. 1,317,746 there is disclosed a new sweetener which is a sugar alcohol mixture consisting mainly of maltitol and maltotriitol. The sweetener has an improved and strong sweetness and a viscosity less than starch syrup, which is relatively freely controllable, and is produced by a process comprising hydrogenating a saccharification product obtained by treating a liquified starch solution with alpha-1,6-glucosidase and beta-amylase. Once again, the earlier disclosure includes specific Examples directed to various foods including cakes and condensed milk.

In International Publication No. WO 80/02226 there is disclosed a dry nutritional food composition adapted for rapid dispersion in water. The composition comprises protein material providing a total protein content of between about 25 and 50% by weight, carbohydrate providing a total carbohydrate content of between about 20 and 50% by weight, lipids providing a total lipid content of between about 5 and 10% by weight, between about 0.4 and 5.0% by weight of non-degradable vegetable fibre consisting of cellulose gum and cellulose gel in the form of finely divided microcrystalline cellulose, and flavouring agents in an amount of about 1% by weight along with vitamins and minerals. The said nutritional food composition when mixed with water being readily dispersible and forming a highly palatable liquid composition which contains sufficient bulk to vaoid discomfort between meals when used as a complete meal replacement. In one aspect the earlier composition is one wherein a serving unit of about 62 grams provides about 50% of the recommended daily requirement of protein, about 45% of the minimum recommended daily requirement of essential vitamins, about 250 calories, and has a combined content of protein, carbohydrate, fat and vegetable fibre which satisfies the hunger of an individual when used as a complete meal replacement.

Also, In European Specification No. 0,127,287 A1 there is disclosed a ready-to-eat guar gum snack food bar for reducing insulin and permitting smooth blood sugar fluctuations for a Type II diabetic. The ready-to-eat guar gum bar is high in carbohydrates, low in fat and high in fibre (guar gum). In general, the liquid components of the bar are blended together, guar gum is then added to the blended liquid and mixed until a homogeneous mixture results. The solids are mixed into the homogeneous mixture and the resulting composition is extruded at room temperature. The ready-to-eat bar has a low moisture content which helps prevent microbial growth and which aids in achieving a stable shelf life.

In one disclosed aspect the food bar of the earlier invention contains on a percentage by weight basis on the total weight of the bar: carbohydrates approximately 50 to 75%, proteins approximately 10 to 15%, fats approximately 8 to 15%, guar gum approximately 8 to 12% and moisture of 8 to 12%. Furthermore, it is said to have been found that 30 g of guar gum (daily) and 195 to 220 g of carbohydrate (daily) satisfactorily meet all the fibre/carbohydrate requirements of a Type II diabetic.

It is clear from the earlier disclosure that the disclosed bar is designed for a very specific dietary purpose related to the treatment of diabetes. As such it is based on a composition which includes guar gum as a soluble fibre, that gum being said to have become the most effective soluble fibre for treatment of Type II diabetes. However, because of that consideration (essential to the earlier invention) the earlier bars and the process of producing them suffer from disadvantages associated with the gum ingredient. In particular, as is recognised in the introduction to the earlier disclosure, guar gums because of their viscosity characteristics can lead to the production of unsatisfactory bars.

As described and claimed in British Specification No. 1,356,370 a very low calorie dietary formulation for the treatment of obesity in man comprises:
  (a) all the minerals required by man;
  (b) proteinaceous material consisting of:
    (i) a mixture of monomeric L-aminoacids, and/or
    (ii) natural proteins, and/or
    (iii) natural proteins reinforced with at least one monomeric L-aminoacid; and
  (c) digestible carbohydrate; such that the smallest amount of the dietary formulation containing at least the minimum daily requirements of each of the minerals required by man also contains:

(A) at least 15 g of the proteinaceous material which must include at least the minimum daily requirements for man of all the essential L-aminoacids required by man; and (B) from 15 g to 75 g of the digestible carbohydrate and such that the total caloric value of the said smallest amount of the dietary formulation is in the range of from 160 Kcals to 600 Kcals.

Very low calorie formula diets of the kind defined above have achieved remarkable commercial success in recent years. Such diets are usually formulated as a dry powder for use when mixed with water, either to produce a savoury flavour drink resembling a soup, or a sweet flavour drink resembling a milk shake. The diets are designed for use as a sole source of nutrition over a lengthy period of time, for example, up to four weeks or more and their use can lead to significant weight losses.

However, since the diet is consumed in liquid form any desire on the part of the dieter to chew what is consumed as the daily diet is frustrated unless the dieter consumes something other than the formula diet itself. On the other hand, if the dieter does consume something other than the formula diet itself out of a desire to chew something, that can negate the effect of the diet and lead to a smaller than expected weight loss, with consequent disappointment, and/or to the breaking of the diet altogether.

While some meal replacement bars for use in conjunction with very low calorie formula diets have been proposed, such bars have to date proved to be unsatisfactory. Known bars have a poor taste and provide a substitute for one or more meals in a very low calorie dietary regimen which is much less palatable than the liquid formula diet itself.

(c) Further Background

In any attempt to produce a meal replacement bar for use in conjunction with a very low calorie formula diet it is necessary to overcome a number of interrelated problems. First, the bar must be both a palatable confectionery product and at the same time sufficiently low in calories so that it is compatible with a very low calorie dietary regime. Secondly, the bar must contain the necessary meal replacement level of protein in the overall diet. While that may vary depending on the form of presentation of the supplement, for example, as one or a plurality of bars for consumption once or a number of times per day, generally a bar should contain sufficient protein to provide at least about one-quarter and preferably at least about one-third of a day's supply of protein within the confines of the particular dietary regimen chosen. That will usually mean the bar must contain at least about 5 grams of protein, and typically from about 10 to about 18 grams of protein.

Thirdly, the bar while having a sweet taste and not exceeding the low energy requirements placed on it by the diet context within which it is intended to be used, should at the same time provide say from about one-quarter to about one-third of a day's supply of carbohydrate, but not significantly more than that amount. Fourthly, it should contain a sufficient proportion of minerals and vitamins to enable it to be used as a meal replacement without detracting from the mineral and/or vitamin levels supplied in the daily diet of which it is a part. Also, the marked taste of any such minerals and/or vitamins must be sufficiently masked so that they do not detract from the palatability of the finished bar.

OBJECTS OF THE INVENTION

It is one object of the present invention to provide a substitute for one or more meals in a very low calorie dietary regimen based on a liquid formula diet which is at least as palatable as the liquid formula diet itself and which has a chewy texture.

Another object of the invention is to provide a palatable confectionery product which is sufficiently low in calories so that it is compatible with a very low calorie dietary regime.

It is yet another object of the invention to provide a product based on compositions which avoid the unacceptable viscosity characteristics of compositions based on gums such as guar gum, and the poor mouthfeel of compositions inlcuding bran or like fibre.

It is a further object of the invention to provide a product in which the "gritty" mouthfeel given when only glucose syrup is used as a base carbohydrate is avoided.

It is a yet further object of the invention to provide a confectionery product as a bar containing a relatively high proportion of protein and having a good, chewy, yet open texture, with good organoleptic characteristics.

In accordance with the foregoing objects I have now found surprisingly that a composition for use in producing such a confectionery product in the form of a bar having a highly acceptable texture can be formulated by using a carbohydrate material comprising non-fibrous indigestible carbohydrate. Such a material can provide the chewy texture required by the dieter—to satisfy the desire to chew—and which is otherwise organoleptically acceptable, generally along with a sweet taste, and the ability to act as a carrier or diluent for the necessary level of proteinaceous material. Also it can aid in masking the taste of minerals and/or trace elements present.

Accordingly, the present invention provides a confectionery product in the form of at least one bar, which product provides in said form a meal replacement or diet supplement and which comprises a proteinaceous material and a carbohydrate material comprising indigestible carbohydrate, the proteinaceous material and the carbohydrate material being present in a relative weight ratio of from about 1:1 to about 1:10, and the indigestible carbohydrate being a carbohydrate having a molecular weight no higher than about 5,000.

DESCRIPTION OF THE INVENTION

For confectionery purposes, and as desired or convenient, manufacturers often produce and package bars in packs of two or more bars. Thus, for example, a 50 gram bar may be produced and packed e.g. wrapped, as two 25 gram bars for convenience or for other reasons of presentation. That being so, and since in certain contexts within the ambit of the invention the confectionery product whether as one or a plurality of bars may necessarily be related to particular doses of ingredients, the product is defined as comprising at least one bar. Accordingly, in the description herein references to a "bar" are to be taken where necessary to be references to one or a plurality of bars.

In the composition used to prepare the product of the invention the carbohydrate material may be any material suitable for human consumption and comprising at least a proportion, preferably at least about 15% by weight, of carbohydrate which is not digested when consumed by man. Thus, the carbohydrate material may be any such material which has been processed, prepared, extracted or otherwise produced in such a manner as to render a proportion or all of it indigestible by man, for example, one or more of those materials as described in the prior art mentioned above. However, it is to be understood that the indigestible carbohydrate should not be fibre as such, that is to say the indigestible portion of the carbohydrate material should be non-fibrous.

As used herein the term "fibre" means the sum in any carbohydrate material of components having a molecular weight in excess of 5,000 and comprising non-starch polysaccharides and lignin not digested by human gastro-intestinal enzymes. That definition is taken from the definition of fibre in the lefthand column on page 926 of the article by H. C. Trowell entitled "Ischemic heart disease and dietary fibre" in The American Journal of Clinical Nutrition, 25, 1972, pages 926 to 932. In addition, the definition is qualified as to molecular weight following the qualification in the paragraph bridging pages 308 and 309 of the article by Becker et al entitled "Dietary Fiber and Bread: Intake, Enrichment, Determination, and Influence on Colonic Function" in Cereal Foods World, 1986, 31(4), pages 306 to 310.

Thus, fibrous carbohydrate material is defined in the art, inter alia, as carbohydrate material having a high molecular weight, in general a molecular weight higher than about 5,000. Accordingly, in the present invention the indigestible carbohydrate has a molecular weight no higher than about 5,000. Preferably, however, the molecular weight of the indigestible carbohydrate used in the invention will be no higher than 1,000 (which is the approximate molecular weight of a polysaccharide containing five monomeric sugars as components).

By using a carbohydrate material as defined above the disadvantages associated with the use of fibrous materials are avoided. In particular, the carbohydrate material used in the invention can provide compositions which avoid the unacceptable viscosity characteristics of compositions based on gums such as guar gum, and the poor mouthfeel of compositions including bran or like fibre. However, at the same time the "gritty" mouthfeel given when only digestible carbohydrate is used as a protein carrier is avoided. As a result the confectionery product of the invention can be produced as a bar containing a relatively high proportion of protein and having a good, chewy, yet open texture, with good organoleptic characteristics, and not as an unacceptable, "gritty" and/or "tough" mass.

A number of carbohydrate materials comprising indigestible carbohydrate are known as exemplified by those described in the prior art mentioned above. Furthermore, a number of such materials are currently commercially available, and the carbohydrate material used in the invention may be any such material. Preferably, however, the indigestible carbohydrate material is one comprising a sugar alcohol or a mixture of sugar alcohols, or a polymer of dextrose, more preferably the former. Thus, in particular the indigestible carbohydrate more preferably comprises maltitol or a like sugar alcohol which is hydrogenated and/or is a disaccharide.

Preferably also, as indicated above, the carbohydrate material provided in the bar comprises at least about 15% by weight of indigestible carbohydrate. More preferably, however, the carbohydrate material provided in the bar comprises at least about 25% or about 30% by weight of indigestible carbohydrate, typically from about 30% to about 75% by weight of indigestible carbohydrate e.g. about 30% to about 50% by weight. Within that context it is to be understood that carbohydrate material provided in the bar may be provided in an overall bar composition, in a bar centre composition, or in a bar centre composition and in an outer coating composition within which the centre is enrobed. That being so, and since most conveniently a bar centre is first produced, which is subsequently enrobed, the indigestible portion of the carbohydrate material typically will be included in the bar centre rather than the enrobing coating. It follows, therefore, that any chosen carbohydrate material comprising indigestible carbohydrate for use in producing the bar centre may be higher in indigestible material than the overall bar including an outer coating. Accordingly, any such material typically may comprise from about 30 to about 95% by weight of indigestible carbohydrate, preferably from about 50 to about 75% or about 80% of indigestible carbohydrate.

Most preferably the indigestible carbohydrate is a mixture of sugar alcohols comprising maltitol and/or maltotriitol and/or other hydrogenated polysaccharides of higher molecular weight. Such a mixture is provided in that material commercially available under the name Malbit (registered Trade Mark). Malbit is said to comprise a solid form containing up to about 90% by weight of maltitol and a liquid form containing from about 73% by weight of maltitol, together with D-sorbitol, hydrogenated trisaccharide and hydrogenated higher polysaccharides. Thus, typical analyses by weight for commercial forms are said to be as follows:

| Ingredient | Liquid form | Solid form |
| --- | --- | --- |
| Maltitol | 73 to 77% | 86 to 90% |
| D-Sorbitol | 2.5 to 3.5% | 1 to 3% |
| Hydrogenated trisaccharide | 9.5 to 13.5% | 5 to 8% |
| Hydrogenated higher polysaccharides | 6.5 to 13% | 2 to 6% |
| Reducing sugar | maximum 0.3% | maximum 0.3% |

The above-mentioned commercially available material based on maltitol, of which the solid form is preferred, affords a sweetness and taste very close to sucrose. For example, the above-mentioned liquid form has a sweetening power of about 60% that of sucrose and the above-mentioned solid form has a sweetening power of about 90% that of sucrose. Furthermore, maltitol has a low acute toxicity ($LD_{50}$ greater than 24 g/kg body weight), comparable to glucose and other commercial sugars.

Maltitol is partially and slowly absorbed through the intestinal wall, the greater part being excreted as such. Thus, from about 25% to about 75%, typically 50%, of maltitol is metabolized by the human organism, and the physiological utilization of maltitol as an energy source is considerably reduced as compared to that of say sucrose or glucose, and other polyalcohols. Therefore, maltitol has a reduced energy content.

Alternatively, the composition used in the invention may comprise a carbohydrate material which is a dextrose polymer such as that sold as polydextrose. Polydextrose is a water-soluble, randomly bonded condensation polymer of dextrose at least 80% by weight of which has a molecular weight below 5,000, and containing minor amounts of bound sorbitol and citric acid. Typically, its composition is as follows:

| Polymer | greater than | 90% |
|---|---|---|
| Glucose | less than | 4% |
| Sorbitol | less than | 2% |
| Levoglucosan | less than | 4% |
| Water | less than | 4% |
| Sulphated Ash | less than | 0.3% |

Polydextrose is only partially metabolized in the human body. Most of the product passes through the body unabsorbed, and the principal utilisation pathway for the remainder involves metabolism by intestinal microorganisms to form carbon dioxide and volatile fatty acids. Those acids can then be absorbed and utilised as an energy source so that in man the energy provided by polydextrose is 1 Kcal per gram.

The proteinaceous material used in the composition for the bar of the invention may be supplied typically either in the form of a mixture of monomeric L-aminoacids or in the form of natural protein, or alternatively in the form of the latter reinforced with at least some of the former. Preferably the aminoacids will be present as monomeric L-aminoacids, since it is then easier to adjust the aminoacid profile to achieve the optimum nitrogen utilization. As will be appreciated, any deviation from the optimum aminoacid profile either leaves the body short of certain aminoacids—with consequent serious disturbances in protein metabolism—or forces the body to make the required aminoacids from other aminoacids, which is a rather inefficient process. In either case, more of the aminoacid mixture is then required by the consumer and makes the composition less suitable for the dietary uses mentioned herein.

The preferred compositions used in this invention are those in which all the L-aminoacids, i.e. both the essential and the semi-essential ones, are present in the relative proportions required by man. The aminoacid profile essential to man is well-known to those skilled in the art and is set out, for example, in Rose, W. C., Wixom, R. L., Lockhart, H. A., and Lambert, G. F., *J. Biol. Chem..* (1955), 217, page 987. The L-aminoacids useful to man are isoleucine, leucine, lysine, methionine, phenylalanine, threonine, tryptophan, valine (those being the so-called essential aminoacids), together with alanine, arginine, aspartic acid, cystine, glutamic acid (or glutamine), glycine, histidine, hydroxyproline, proline, serine and tyrosine (the so-called non-essential or semi-essential aminoacids).

Where the composition contains the aminoacids in the form of natural protein, such protein may be egg protein (egg albumin), since that already contains aminoacids in the relative proportions required by man (see Davidson, S. and Passmore, R., "Human Nutrition and Dietetics", E. & S. Livingstone, (1969), page 80). However, despite being deficient in one or more aminoacids, other proteinaceous materials may also be employed, preferably for instance such proteinaceous materials as those derived from milk, soya beans, peanuts, fish and plasma proteins. When such aminoacid-deficient proteins are used, it is necessary either to add the appropriate aminoacids to adjust the profile accordingly, or to give an excess of protein such that the minimum requirements of even the most deficient aminoacid are met.

Especially preferred are milk proteins such as caseinates and whey protein, or whey protein concentrates, which may contain some lactose and mineral salts. For example, one especially preferred proteinaceous material is that sold as Lactein 60 and comprising at least 60% of milk proteins. Another preferred proteinaceous material is that sold as Lactalbumin 65.

The confectionary product of the invention provides an excellent vehicle for the presentation of minerals and trace and/or vitamins in a chewy bar form. Accordingly, the composition used in the invention preferably is one which also included one or more minerals and trace elements and/or vitamins required by man. In particular, the composition is one including at least one compound of magnesium, iron, zinc, copper or manganese to provide at least one said element. Those elements are the ones most usually lacking in modern diets and preferably are provided in an amount of at least about 25% (more preferably at least about 30%) of the recommended daily allowance of element(s) per bar. More preferably, the composition used to produce the product of the invention should include at least essentially all of the minerals and trace elements and/or vitamins required by man. Most preferably, the composition includes at least essentially all of the minerals and trace elements and/or vitamins required by man in at least substantially the relative proportions required by man.

Minerals and trace elements required by man generally are considered to be sodium, potassium, calcium, magnesium, iron, chlorine, fluorine, phosphorus, sulphur and iodine, together with other trace elements as mentioned herein. Those which are most likely to be deficient in any dietary formulation and which must therefore be monitored with particular care are calcium, phosphorus, iodine, iron, and magnesium. Accordingly, the preferred compositions used in the invention include at least some of each of those five minerals and trace elements. More preferably, however, other perhaps less critical mineral requirements are also met, for example, by including sodium, potassium and other minerals as mentioned above.

Concerning other trace elements, those may be supplied in sufficient amounts within the above-mentioned broad definitions. Preferably, however, any other trace element component included in the composition used in the invention should be one comprising at least one compound of a trace element selected from zinc, copper, manganese, chromium, selenium or molybdenum or a mixture of two or more such compounds. Most preferably, the composition used in the invention should include at least essentially all of the minerals and trace elements mentioned above.

In the product of the invention, minerals and trace elements may be incorporated as any suitable edible compound. Preferably, however, the compound or compounds chosen should not otherwise detract from the product. Thus, for example, in the case of magnesium, salts such as the sulphate, carbonate or phosphate, or the hydroxide, are preferred to the oxide in a confectionary product because the latter can cause unacceptable darkening in colour and other depreciation over a period of time. Sodium is also preferably included at least in part as sodium glycerophosphate, and potassium is preferably included at least in part as a phosphate e.g. potassium dihydrogen orthophosphate.

Preferably also, the product of the invention includes vitamins required by man. As is well-known vitamins considered probably to be essential are vitamin A (either as such or as carotene), vitamin $B_{12}$ (cyanocobalamin), vitamin C (ascorbic acid), vitamin D (e.g. calciferol), vitamin E (tocopherol e.g. as dl-alpha-tocopheryl acetate), vitamin K (or 2-methyl-1:4-naphthaoquinone-menadione—or as phytomenadione), para-aminobenzoic acid (preferably given as the potassium salt), Vitamin $B_2$ (riboflavin), Vitamin $B_6$ (pyridoxin), niacin e.g. as nicotinamide, inositol, pantothenic acid, e.g. as a calcium salt, biotin, folic acid, choline and Vitamin $B_1$ e.g. as thiamin hydrochloride. Most preferably, the product of the invention includes at least essentially all of those vitamins, for example, as described below.

Even when subjected to dietary restriction, man requires certain amounts of fat, oil or other source of essential fatty acid. Preferably, therefore, the product of the invention also includes one or more fatty acids as required by man, especially linoleic acid. Typically, the fatty acid may be present in the form of a highly unsaturated vegetable oil or phosphatide, preferably one containing a high content, generally at least about 25%, of linoleic acid such as, for example, safflower seed oil, ethyl linoleate or a soya phosphatide.

In the confectionary product of the invention, it is preferred that the ratio by weight of proteinaceous material to total carbohydrate material should be from about 1:1 to about 1:4, more preferably about 1:2. Furthermore, it is preferred that the ratio by weight of proteinaceous material to digestible carbohydrate should be in the range of from about 1:0.5 to about 1:5, e.g. about 1:1 to about 1:5. More preferably, the ratio by weight of proteinaceous material to digestible carbohydrate is in the range of from about 1:1 to about 1:4, and most preferably from about 1:1 to about 1:3.

Preferably also, the confectionery product of the invention includes one or more flavouring agents or materials. For example, as described below the product may include flavouring agents or materials to impart various sweet flavours. Furthermore, the product may include where necessary or required one or more artificial sweeteners, for example, aspartame, a cyclamate, or saccharin.

The confectionery product of the invention is at least one confectionary bar, typically a bar having a weight of about 50 grams. Preferably, the bar is put up in a form where it can be used as a single bar, but packs comprising a plurality of bars for use together e.g. as two bars per meal, can be put up if desired. Within those considerations the confectionery product of the invention preferably includes from about 3 to about 21 grams of proteinaceous materials, and more preferably from about 10 to about 15 grams of proteinaceous materials, for example, about 11 grams of such material. Preferably also, the confectionery product includes one or more of the minerals and trace elements and/or vitamins required by man in an amount of at least about 25%, typically of from about 30% to about 150% of the recommended daily allowance thereof. More preferably, however, the one or more minerals and trace elements and/or vitamins are required by man are included in an amount of from about 30% to about 100% of the recommended daily allowance. In that respect it is to be noted that for any chosen diet regime it may be desirable to have up to about 25% more of any minerals and trace elements and/or vitamins than the theoretically required amount.

Up to the present time the authorities of various countries, as well as international bodies, have attempted to define in various ways the minimum daily human requirements of mineral and trace elements. Thus, in some countries such as the U.K., there is a recommended daily dietary allowance (RDA) figure for certain of the listed elements, whereas for other elements no such U.K. RDA figure has so far been given. Furthermore, the RDA figure for any particular element can vary from country to country.

However, the National Academy of Sciences in the U.S.A. has sought to define a range of Adequate Daily Dietary Intake (ADDI) for each such necessary element, and the figures given below are taken from "Recommended Dietary Allowances" Ninth Revised Edition, 1980, National Academy of Sciences Washington, D.C. Nevertheless, it is to be understood that where for any particular country an RDA figure is lower of higher, that figure may be adopted as necessary or desired.

Thus, for example, in the U.K. the only RDA figures given to the above-listed minerals and trace elements are as follows:

| | |
|---|---|
| Calcium | about 500 mg |
| Iron | about 12 mg |
| Iodine | about 140 mcg, | and the remaining minerals and trace elements are not assigned an "official" RDA. However, preferred minimum levels taken from the U.S. ADDI ranges can be stated as follows (it being understood that higher levels are useable where desired or appropriate):

| | |
|---|---|
| Calcium | about 800 mg |
| Phosphorus | about 800 mg |
| Magnesium | about 300 mg, for example, from about 300 to about 400 mg, typically about 350 mg |
| Iron | about 18 mg |
| Iodine | about 150 mcg |
| Potassium | about 1875 mg and up to about 5625 mg, typically 2.0 g |
| Sodium | about 1100 mg and up to about 3300 mg, typically 1.5 g |
| Chlorine | about 1700 mg and up to about 5100 mg, typically 1.8 g |
| Fluorine | about 1.5 mg, for example, from about 1.5 to about 4.0 mg |
| Zinc | about 15.0 mg |
| Copper | about 2.0 mg, for example, from about 2.0 to about 3.0 mg |
| Manganese | about 2.5 mg, for example, from about 2.5 to about 5.0 mg, typically about 4 mg |
| Selenium | about 50 mcg, for example, from about 50 to about 200 mcg, typically about 125 mcg |
| Chromium | about 50 mcg, for example, from about 50 to about 200 mcg, typically about 125 mcg |
| Molybdenum | about 250 mcg, for example, from about 150 to about 500 mcg |

Most preferably, the confectionery product of the invention includes at least essentially all of the minerals and trace elements listed above. Furthermore, the mineral and trace element content may be adjusted so that the confectionery product provides, for example: either 1. A meal replacement product—with the contents being set per meal e.g. per bar, at say about one-quarter or about one-third of the recommended daily allowance or 2. A dietary supplement—with the contents being set per meal e.g. per bar, at about 100% of the recommended daily allowance.

However, because a high concentration of sodium in a confectionery product such as a bar give an over-pronounced salty taste, it is desirable to lower the sodium content for such products below the level of 1100 mg/day, which is the lower limit of the U.S. ADDI. Accordingly, in the present invention for sodium a level of from about 700 mg to about 1000 mg/day is preferred in the case of a confectionery product and more preferably about 900 mg/day (or say about 300 mg/bar).

For people using diets for weight reduction these lower levels of sodium are believed to be quite safe and will not lead to any ill-effects due to sodium depletion when used as a meal replacement. Furthermore, when using the product as a dietary supplement it is an advantage to have the sodium content as low as possible since normal meals contain large quantities of sodium often in excess of the U.S. ADDI.

In addition, the composition used in the invention preferably may include one or more vitamins, which again may be included on the same or a similar preferred basis as the above-mentioned minerals and trace elements, namely in terms of a recommended daily dietary allowance. More preferably, however, vitamins may be included in amounts in excess of their RDA, with preferred levels per daily portion (e.g. for a dietary supplement bar) being as follows:

| Vitamin and Amount | Percentage of U.K. RDA |
| --- | --- |
| Vitamin A about 1.0 mg | 133 |
| Vitamin $B_1$ about 1.5 mg | 125 |
| Vitamin $B_2$ about 1.7 mg | 106 |
| Niacin about 19.0 mg | 106 |
| Vitamin $B_6$ about 2.2 mg | * |
| Pantothenic Acid about 7.0 mg | * |
| Biotin about 200.0 mcg | * |
| Folic Acid about 400.0 mcg | 133 |
| Vitamin $B_{12}$ about 3.0 mcg | 150 |
| Vitamin C about 60.0 mg | 200 |
| Vitamin $D_3$ about 10.0 mcg | 400 |
| Vitamin E about 10.0 mg | * |
| Vitamin K about 140.0 mcg | * |

(*No U.K. RDA - figure within ADDI range).

However, as for the case of minerals and trace elements the above amounts will be reduced to say one-quarter or one-third of those stated where it is desired to provide a meal replacement bar or like confectionery product.

Preferably, the confectionery product of the invention also includes from about 3 to about 25 grams of fat. The amount of oil and fat required by man is subject to some uncertainty—but following "Human Nutrition and Dietetics" (loc. cit.) page 112, it may be assumed to be from about 2.4 to about 3.8 grams per day. Accordingly, the preferred meal replacement product of the invention should include at least about 1 gram of linoleic acid, with the amount being correspondingly increased if desired for a dietary supplement.

In producing the confectionery product of the invention it is generally desirable to keep the energy value of the product as low as possible. Typically, the product has an energy value of from about 60 to about 360 Kcals, preferably from about 60 to about 200 Kcals. Most preferably, however, the product, as one or more bars, has an energy value of from about 150 to about 170 Kcals.

Preferably also, the confectionery product of the invention is produced as a confectionery bar which comprises a bar centre having an outer coating. Such an outer coating preferably comprises chocolate or carob, and the bar centre itself preferably has a malt toffee, caramel, lemon, ginger, lemon and ginger, peanut or chocolate flavour.

As indicated above, the confectionery product of the invention may be provided as a meal replacement product, generally in the form of at least one bar. Such a product is especially useful within the context of a very low calorie dietary regimen, in particular one such as is described in British Specification No. 1,356,370.

In addition, as indicated above, by using a partially digestible carbohydrate material a confectionary bar can be formulated to provide not only a sweet taste and any desired or necessary level of digestible carbohydrate, but also to act as a carrier or diluent for the necessary levels of proteinaceous material, minerals and trace elements and/or vitamins. Of course, and as will be appreciated, where the partially digestible carbohydrate material does not in itself provide a sweet taste, an artificial sweetener such as those mentioned above may be included as necesary or desired. Additionally or alternatively, where sweetness is required and/or it is desired to increase the level of digestible carbohydrate, a sweet digestible carbohydrate, for example, glucose or sucrose etc. may be included, for example, either in the bar centre or an outer coating or both.

Within the above context, the invention particularly provides a confectionery product wherein the proportions of proteinaceous material, digestible carbohydrate and fat, together with minerals and trace elements and/or vitamins are chosen such that the product is suitable for use as a meal replacement in a method as defined in said earlier British Specification No. 1,356,370, (which is incorporated herein by reference) that is to say a method for the treatment of obesity in man, which comprises the steps of giving the overweight patient a daily diet comprising:

(a) at least the minimum daily requirement of minerals and trace elements required by man;

(b) proteinaceous material comprising:
 (i) a mixture of monomeric L-aminoacids, and/or
 (ii) natural proteins, and/or
 (iii) natural proteins reinforced with at least one monomeric L-aminoacid;

(c) digestible carbohydrate;

(d) at least the minimum daily requirement of vitamins required by man; and (e) sufficient fat, oil or other source of essential fatty acid to supply the patient's minimum fatty acid requirements; such that the amount of proteinaceous material given daily is at least about 15 grams and contains at least the minimum daily requirements for man of typically all of the essential L-aminoacids required by man, the amount of digestible carbohydrate given daily is from about 15 grams to about 75 grams, and that the total energy value of the daily diet is in the range of from about 160 Kcals to about 600 Kcals.

In another preferred aspect, the product of the invention may include L-tryptophan as an agent for the control of appetite. Use of L-tryptophan for that purpose in conjunction with a protein-restricted diet and generally in an amount of at least about 0.5 grams per day, for example, from about 3 to about 10 or about 12 grams per day, is disclosed in co-pending British Application No. 86-22618 published as British Specification No. 2,180,747A on 8th April, 1987, which again is incorporated herein by way of reference. As will be appreciated from what is said above, the present invention can permit the incorporation of relatively large amounts of L-tryptophan, together with other proteinaceous material as necessary, in a confectionery bar.

Besides the bar per se as described herein, the invention also provides a process for preparing a confectionery product in the form of at least one bar, which process comprises shaping a bar as such or a bar centre from a composition comprising a proteinaceous material and a carbohydrate material, the proteinaceous material and the carbohydrate material being in a relative weight ratio of from about 1:1 to about 1:10, and the carbohydrate material comprising indigestible carbohydrate having a molecular weight no higher than about 5,000, any bar centre thus prepared being coated as necessary or desired.

Preferably, in the process of the invention the indigestible carbohydrate used is in a solid particulate form and preferably it is conditioned by contact with water or an aqueous medium prior to shaping. Generally speaking, when using a sugar alcohol or the like in solid particulate form e.g. as a powder, the texture of the final product can be improved by an initial conditioning with water or an aqueous medium. The length of time for such conditioning will depend on the particle size of the indigestible carbohydrate, its particle size distribution, its solubility in water and/or its molecular weight. However, it is not necessary to achieve complete dissolution or dispersion of the indigestible carbohydrate in water or an aqueous medium to achieve a useful conditioning effect on the carbohydrate material. Furthermore, provided conditioning is effected for a suitable time period consistent with the particular indigestible carbohydrate used prior to further processing to produce the bar or bar centre, by effecting conditioning the thus-produced bars can be given a chewier and more open texture.

Preferably also, since proteinaceous materials tend to be hydrophilic, the indigestible carbohydrate is conditioned by contact with water or an aqueous medium prior to mixing with the proteinaceous material.

In carrying out the process of the invention the carbohydrate material preferably is one of the preferred materials mentioned above. More preferably it comprises maltitol or a like hydrogenated polysaccharide. Preferably also, the carbohydrate material is conditioned for a time period of from about 5 to about 20 minutes at ambient temperature. Furthermore, the conditioning is preferably effected using an aqueous solution or dispersion including one or more of the mineral ingredients desired in the final formulation to be used to produce the bar or bar centre.

The bar or bar centre may be prepared and shaped from the final formulation by any conventional confectionery technique. After preparation a bar centre can be enrobed in any desired outer coating, preferably a chocolate coating.

More preferably, the process of the invention may include one or more of the following steps:

1. All ingredients are carefully checked, sieved and, in the case of liquid ingredients, filtered to eliminate possible contamination and to ensure that a maximum desired particle size, preferably of about 2 mm, is not exceeded.

2. At least some of the mineral ingredients as desired are dissolved/dispersed in the formulation quantity of water.

3. This solution/dispersion of mineral ingredients is added to a mixer which is preferably of the Z-blade or similar type. The formulation quantity of carbohydrate material, preferably comprising maltitol, is added to the solution/dispersion in the mixer and sufficient time is allowed for conditioning e.g. by softening of say the maltitol, to take place. This time period varies with batch size and carbohydrate, and typically can be from about 5 to about 20 minutes.

4. While the maltitol or other insoluble carbohydrate is being conditioned as in step 3 a vitamin/mineral premix is mixed with the proteinaceous material in powder form and that mixture is then added to the conditioned carbohydrate mix, followed by any flavours and other ingredients e.g. lecithin.

5. The mixing time is controlled to ensure the required open texture is maintained and immediately prior to preparation of the bar centres any necessary additional fatty acid ingredients are added.

6. After formation of the bar centres, and metal detection, the bar centres are enrobed with chocolate or other desired coating, cooled, wrapped, further metal-detected and then examined before packing.

DESCRIPTION OF THE PREFERRED EMBODIMENTS

The invention will now be described by way of example only, with reference to the following specific Examples.

EXAMPLE 1

A chocolate coated bar is prepared from the following composition:

| Ingredient | Parts by weight |
| --- | --- |
| Malbit (dry matter) | 5.2 |
| Lactein 60 | 3.75 |
| (a milk protein material sold by Dairy Crest Foods and comprising at least 60% proteinaceous material, together with lactose and minerals) | |
| Sodium caseinate | 1.5 |
| Sodium glycerophosphate | 0.62 |
| Emulfluid E | |
| (water-dispersable soyabean lecithin sold by Lucas Meyer (U.K.) Ltd) and glycerollactostearate in a weight ratio of 2:1 | 0.2 |
| Potassium chloride B.P. 80 | 0.268 |
| CC 20/A | 0.116 |
| (Calcium carbonate sold by Pennine Darlington Magnesia Ltd) | |
| Potassium dihydrogen orthophosphate | 0.090 |
| PDM/02/100 | 0.061 |
| (light pharmaceutical quality magnesium oxide sold by Pennine Darlington Magnesia Ltd) | |
| Vitamin and mineral core (see below) | 0.06 |
| Flavouring agent(s) | 0.11 |

The above ingredients in kilogram quantities e.g. 520 kg of Malbit etc., are mixed with 180 kg of water to provide a mix which is then heated to a formable mass and formed and cut to produce bar centres of about 39 grams each. The bar centres are then each covered with about 13 grams of a low fat milk chocolate coating (in total 3.769 kg) and comprising about 45% sugar to provide chocolate coated bars. Each such bar has a weight of about 50 grams and comprises about ⅓ of a day's supply of vitamins and minerals (except for sodium), together with about 11 grams of protein, and has an energy level of about 142 Kcals per bar.

The vitamin and mineral core used in the above composition can have the following composition per kilogram quantity:

| Ingredient | Amount | |
|---|---|---|
| Riboflavin | 778 | mg |
| Thiamine Hydrochloride | 678 | mg |
| Folic Acid | 182 | mg |
| Biotin | 91.0 | mg |
| Pyridoxine Hydrochloride | 1.4 | g |
| Vitamin D3 | 340,000 | i.u. |
| Cyanocobalamin | 1.37 | mg |
| Phytomenadione (Vitamin K) | 63.7 | mg |
| Calcium Pantothenate | 3.82 | g |
| Nicotinamide | 9.50 | g |
| Vitamin A | 1,667,000 | i.u. |
| dl-alpha-Tocopheryl Acetate | 22.8 | g |
| Ascorbic Acid | 30.0 | g |
| Ferrous Fumarate ($C_4H_2FeO_4$) | 25.2 | g |
| Zinc Oxide (ZnO) | 8.46 | g |
| Copper Sulphate Anhyd. ($CuSO_4$) | 3.42 | g |
| Manganese Sulphate ($MnSO_4$, $4H_2O$) | 7.38 | g |
| Chromic Chloride ($CrCl_3$, $6H_2O$) | 291 | mg |
| Magnesium Hydroxide ($Mg(OH)_2$) | 345 | g |
| Sodium Selenite Anhyd. ($Na_2SeO_3$) | 123 | mg |
| Sodium Molybdate ($Na_2MoO_4$, $2H_2O$) | 287 | mg |
| Potassium Iodide (KI) | 89.1 | mg |
| Monocalcium Phosphate ($Ca(H_2PO_4)_2$) balance to | 1 | kilogram |

Also, the flavour can be selected from caramel, and lemon and/or ginger flavours.

EXAMPLE 2

A chocolate coated bar having a chocolate flavour centre is prepared as described in Example 1, except that the flavouring agent(s) are replaced by 0.6 parts of low fat cocoa powder and 190 kg of water are used in the mix. Again, each bar has an energy level of about 142 Kcals.

EXAMPLE 3

Bars similar to those of Example 1 and Example 2 are also produced using respectively half the amount of proteinaceous material and twice the amount of proteinaceous material with similar results.

EXAMPLE 4

A one-a-day bar is produced as for the bars of Examples 1, 2 or 3, except that the vitamin and mineral core is adjusted (approximately ×3) to provide a day's supply of vitamins and minerals in a single bar.

EXAMPLE 5

A chocolate coated bar having a chocolate flavour centre is prepared from a formulation comprising the following ingredients (including the chocolate coating composition):

| Ingredient | Ingredient by weight |
|---|---|
| Malbit | 25.92 |
| Sodium caseinate | 7.48 |
| Cocoa powder | 2.99 |
| Vitamin/mineral mix | 1.34 |
| Potassium chloride | 1.34 |
| Calcium dihydrogen | 0.45 |

-continued

| Ingredient | Ingredient by weight |
|---|---|
| orthophosphate | |
| Sodium glycerophosphate | 3.09 |
| Calcium Carbonate | 0.76 |
| Lecithin | 1.00 |
| Hydrogenated Palm Kernal Oil | 1.50 |
| Lactalbumin 65 | 18.69 |
| Water | 10.47 |
| Milk chocolate composition for coating | 25.00 |
| Total | 100.00 |

In the above formulation the vitamin and mineral mix comprises:

| Ingredient | Ingredient by weight |
|---|---|
| Calcium dihydrogen orthophosphate | 55.661 |
| Magnesium hydroxide | 32.955 |
| Ascorbic acid | 3.000 |
| Ferrous fumarate | 2.518 |
| Copper gluconate | 0.954 |
| Nicotinamide | 0.950 |
| Vitamin E | 0.909 |
| Zinc oxide | 0.846 |
| Manganese sulphate monohydrate | 0.559 |
| Vitamin A acetate | 0.513 |
| Calcium D-pantothenate | 0.382 |
| Vitamin D3 | 0.200 |
| Vitamin B12 0.1% on mannitol | 0.136 |
| Pyridoxine hydrochloride | 0.133 |
| Thiamine hydrochloride | 0.092 |
| Riboflavin | 0.078 |
| Chromic chloride | 0.029 |
| Sodium molybdate monohydrate | 0.029 |
| Folic acid | 0.020 |
| Sodium selenite | 0.012 |
| D biotin | 0.009 |
| Potassium iodide | 0.009 |
| Vitamin K1 | 0.006 |
| Total | 100.000 | and the milk chocolate composition for the coating comprises:

| Ingredient | Ingredient by weight |
|---|---|
| Sugar | 45.61 |
| Full cream milk powder | 21.30 |
| Cocoa butter | 19.98 |
| Cocoa mass | 12.45 |
| Emulsifiers | 0.63 |
| Flavors | 0.03 |
| Total | 100.00 |

The bars are prepared by the following manufacturing steps:

1. All ingredients are carefully checked, sieved and, in the case of liquid ingredients, filtered to eliminate possible contamination and to ensure that a maximum desired particle size of about 2 mm is not exceeded.

2. The mineral salts with the exception of those in the vitamin/mineral mix are dissolved/dispersed in the formulation quantity of water.

3. This solution/suspension of mineral salts is added to a mixer of the Z-blade or similar type. The formulation quantity of Malbit is added to this liquid in the mixer and sufficient time allowed for softening of the Malbit to take place—this time period varies with batch size and typically can be from about 5 to about 20 minutes.

4. While the Malbit is being conditioned as described in step 3, the vitamin/mineral mix is premixed with the milk protein powders (sodium caseinate and Lactalbumin 65) and that mix is then added to the mature Malbit mix, followed by the flavours and the lecithin.

5. The mixing time is controlled to ensure the required open texture is maintained and immediately prior to bar formation the fat is added.

6. After bar formation and metal detection, the product is enrobed with the chocolate coating, cooled, wrapped, further metal-detected and then examined before packing.

The bars thus produced analyse per bar as follows:

| | |
|---|---|
| Weight | 52 grams |
| Energy | 161.8 Kcals |
| Protein by weight | 10.93 |
| Fat by weight | 6.17 |
| Available carbohydrate by weight | 15.89 |
| Unavailable carbohydrate by weight | 6.74 |
| Vitamins and minerals | at least ⅓ of RDA |

EXAMPLE 6

The manufacturing process of Example 5 is repeated to produce a chocolate coated bar having a malt toffee, caramel, peanut or lemon and ginger flavour based on a formulation comprising the following ingredients:

| Ingredient | Percentage by weight |
|---|---|
| Malbit | 27.13 |
| Sodium caseinate | 7.83 |
| Flavor as appropriate | 0.65 |
| Vitamin/mineral mix | 1.40 |
| Potassium chloride | 1.40 |
| Calcium dihydrogen orthophosphate | 0.47 |
| Sodium glycerophosphate | 3.24 |
| Calcium carbonate | 0.80 |
| Lecithin | 1.04 |
| Hydrogenated Palm Kernal Oil | 1.57 |
| Lactalbumin 65 | 19.67 |
| Water | 9.91 |
| Milk chocolate composition for coating | 25.00 |
| Total | 100.00 |

The bars thus produced analyse per bar as follows:

| | |
|---|---|
| Weight | 52 grams |
| Energy | 162.3 Kcals |
| Protein by weight | 11.10 |
| Fat by weight | 6.07 |
| Available carbohydrate by weight | 16.12 |
| % Unavailable carbohydrate by weight | 7.05 |
| Vitamins and minerals | at least ⅓ of RDA |

EXAMPLE 7

Bars are produced as in each of Examples 1 to 6 except that in the bar centre formulation the Malbit ingredient is replaced by polydextrose and the bar centre formulation includes 50 mg per bar centre of aspartame as artificial sweetener.

EXAMPLE 8

Bars are produced as in each of Examples 1 to 6 except that in the bar centre formulation the Malbit ingredient is replaced by a mixture of 1 parts by weight of glucose (as syrup) with 1 part by weight of polydextrose. Also, if desired, the enrobing coating composition can comprise 2 parts by weight of glucose and 1 part by weight of polydextrose in place of sugar.

EXAMPLE 9

Examples 1 to 8 are repeated except that the bars are produced at half the stated weight and two bars are wrapped together to provide a single product presentation.

It is, of course, to be understood that the invention is not limited to the details of the above specific Examples and that numerous variations in types and amounts of ingredients may be made within the ambit of the invention as broadly defined herein and in the claims.

I claim:

1. A smooth and chewy, low calorie confectionery bar comprising:
   fat;
   proteinaceous material; and
   carbohydrate material including digestible carbohydrate and indigestible carbohydrate, said indigestible carbohydrate being polydextroxe or maltitol, said proteinaceous material and said carbohydrate material being present in a weight ratio of from about 1:1 to about 1:10.

2. The confectionery bar of claim 1, wherein the proteinaceous material includes a mixture of monomeric L-amino acids, or natural proteins, or natural proteins reinforced with at least one monomeric L-amino acid.

3. The confectionery bar of claim 1, wherein the carbohydrate material includes at least about 50% by weight of indigestible carbohydrate.

4. The confectionery bar of claim 1, further including at least one compound incorporating an element selected from the group consisting of magnesium, iron, zinc, copper and manganese, at least one of said elements being provided in an amount of at least about 25% of the recommended human daily allowance of said element.

5. The confectionery bar of claim 1 further including the human minimum daily requirement of minerals or vitamins.

6. The confectionery bar of claim 1, wherein the ratio by weight of proteinaceous material to digestible carbohydrate ranges from about 1:05 to about 1:5.

7. The confectionery bar of claim 1, wherein the ratio by weight of proteinaceous material to carbohydrate material ranges from about 1:1 to about 1:4.

8. The confectionery bar of claim 1 further including L-tryptophan as an agent for the control of appetite.

9. The confectionery bar of claim 1 wherein the proteinaceous material includes from about 3 to about 21 grams of protein.

10. The confectionery bar of claim 1, wherein the proteinaceous material includes from about 10 to about 15 grams of protein.

11. The confectionery bar of claim 1 further including at least one mineral or vitamin in an amount of from about 30% to about 100% of the recommended human daily allowance.

12. The confectionery bar of claim 1, wherein the energy value ranges from about 60 to about 200 Kcals.

13. The confectionery bar of claim 1 further including minerals or vitamins in an amount of at least about 100% of the recommended human daily allowance.

* * * * *